(12) United States Patent
Reichow et al.

(10) Patent No.: US 8,257,087 B2
(45) Date of Patent: Sep. 4, 2012

(54) LOW CONTRAST TRAINING

(75) Inventors: Alan W. Reichow, Beaverton, OR (US); Richard Avis, Tigard, OR (US)

(73) Assignee: Nike, Inc., Beaverton, OR (US)

( * ) Notice: Subject to any disclaimer, the term of this patent is extended or adjusted under 35 U.S.C. 154(b) by 895 days.

(21) Appl. No.: 12/117,290

(22) Filed: May 8, 2008

(65) Prior Publication Data

US 2009/0280459 A1 Nov. 12, 2009

(51) Int. Cl.
*A63B 69/00* (2006.01)
(52) U.S. Cl. ........ 434/247; 434/248; 434/251; 434/252; 434/257; 434/258
(58) Field of Classification Search .................. 434/247, 434/248, 249, 251, 252, 257, 258, 259
See application file for complete search history.

(56) References Cited

U.S. PATENT DOCUMENTS

| | | | |
|---|---|---|---|
| 4,751,642 A * | 6/1988 | Silva et al. | 473/152 |
| 4,915,384 A * | 4/1990 | Bear | 473/451 |
| 5,549,302 A | 8/1996 | Lapsker | |
| 5,622,369 A | 4/1997 | Rogers | |
| 5,993,334 A * | 11/1999 | McNamara | 473/446 |
| 6,811,258 B1 | 11/2004 | Grant | |
| 6,893,127 B2 | 5/2005 | Reichow et al. | |
| 7,773,097 B2 * | 8/2010 | Merzenich et al. | 345/619 |
| 2002/0032071 A1 * | 3/2002 | Gallagher | 473/256 |
| 2006/0033283 A1 | 2/2006 | Cheng | |
| 2007/0166675 A1 * | 7/2007 | Atkins et al. | 434/236 |

OTHER PUBLICATIONS

PCT Search Report; PCT Number: PCT/US2009/043132; dated Jun. 26, 2009.
Rouse, et al., "A Comparison Study of Dynamic Visual Acuity Between Athletes and Nonathletes", Journal of the American Optometric Association, Dec. 1988, pp. 946-950, vol. 59, No. 12, United States.
Coffey, et al., "Optometric Evaluation of the Elite Athlete," Problems in Optometry, Mar. 1990, pp. 32-59, vol. 2, No. 1, United States.
Reichow, et al., "Introduction to Behavioral Optometry", Sports Vision, 1993, 75 pages, Optometric Extension Program Foundation, United States.
Farrow, et al., "An Investigation of the Effectiveness of Bolle's Competivision Sport-Glasses on Tennis Performance", Clinical and Experimental Optometry, Jul.-Aug. 2000, pp. 226-231, vol. 83, No. 4.
Reichow, et al., "A Comparison of Contrast Sensitivity in Elite Athletes Versus a Normal Population", American Journal of Optometry and Physiological Optics, Dec. 15, 1986, vol. 63, No. 82, United States.

* cited by examiner

*Primary Examiner* — Gene Kim
*Assistant Examiner* — Joseph B Baldori
(74) *Attorney, Agent, or Firm* — Shook, Hardy & Bacon L.L.P.

(57) ABSTRACT

Methods and equipment to improve the visual ability of a subject during athletic activities are provided. One such method includes configuring a sporting object to visually approximate the appearance of a background or configuring a background to visually approximate the appearance of a sporting object. A subject may then train using the sporting object visually in front of the low contrast background. A background where the visual appearance of the background comprises at least one depiction of the sporting object may be used. A subject may then train using the sporting object visually in front of the background.

9 Claims, 5 Drawing Sheets

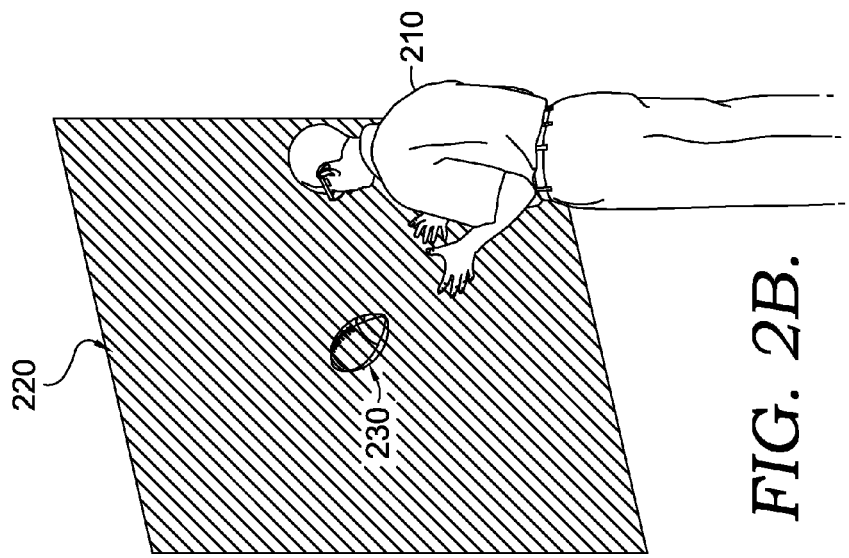
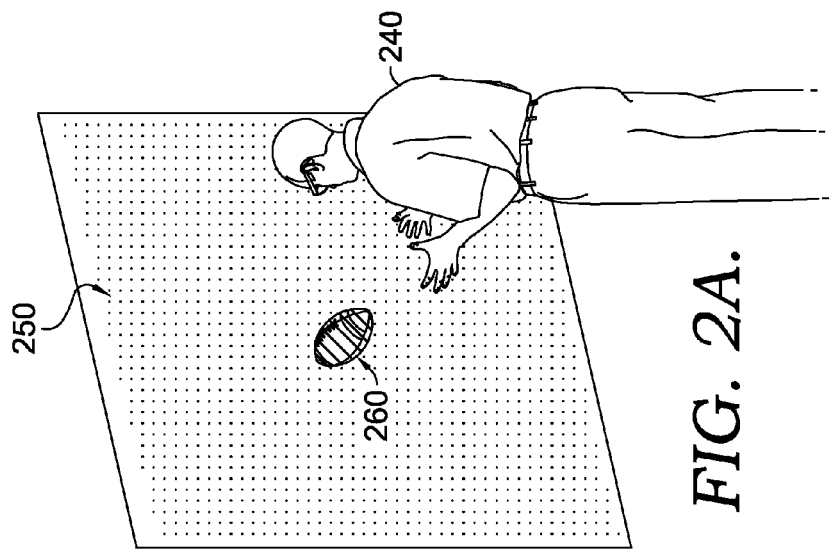

LOW CONTRAST TRAINING

FIELD OF THE INVENTION

This invention relates generally to the training of the visual abilities of individuals. More particularly, the present invention relates to methods of training using sporting equipment configured to enhance visual ability of a subject.

BACKGROUND

One skilled in the art will appreciate that improving one's visual ability may improve an individual's overall ability when participating in athletic activities. In achieving this, various aspects of visual ability may be improved. One such aspect of visual ability is the way one's visual sensory system responds to particular frequencies of light reflected off of an object, as well as the way one's visual sensory system responds to the contrast of light of different frequencies reflected off of objects of different (or similar) colors.

SUMMARY

In accordance with the present invention, equipment and methods are provided to improve the visual abilities of a subject during athletic activities. A method in accordance with the present invention may comprise, in part, providing a background having assigned visual values; providing a sporting object; configuring the visual appearance of the sporting object based on the visual values of the background; and training a subject using the sporting object visually in front of the background.

A further method in accordance with the present invention may comprise, in part, providing a sporting object having assigned visual values; providing a background; configuring the visual appearance of the background based on the visual values of the sporting object; and training a subject using the sporting object visually in front of the background.

Yet a further method in accordance with the present invention may comprise, in part, providing a sporting object; providing a background depicting graphics resembling the sporting object; and training a subject using the sporting object visually in front of the background.

Yet a further method in accordance with the present invention may comprise, in part, providing a sporting object; providing a background depicting a location where a subject may compete in an athletic ability; and training the subject using the sporting object visually in front of the background.

Equipment in accordance with the present invention may comprise a sporting object with a visual appearance configured based upon the visual appearance of a visual background used in training with the sporting object. Equipment in accordance with the present invention may also comprise a visual background for use in training with a sporting object, with the visual appearance of the visual background configured based upon the visual appearance of the sporting object.

It should be noted that this Summary is provided to generally introduce the reader to one or more select concepts described below in the Detailed Description in a simplified form. This Summary is not intended to identify key and/or required features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIGS. 2A-2B illustrate further equipment in accordance with the present invention;

DETAILED DESCRIPTION

Figure 1B:
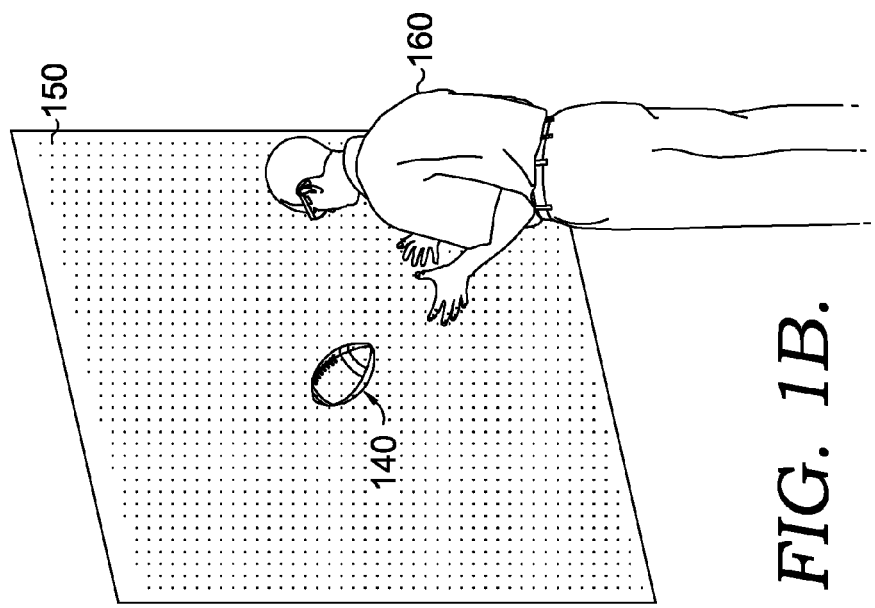
FIGS. 1A-1B are views of equipment in accordance with the present invention.
Figure 1A:
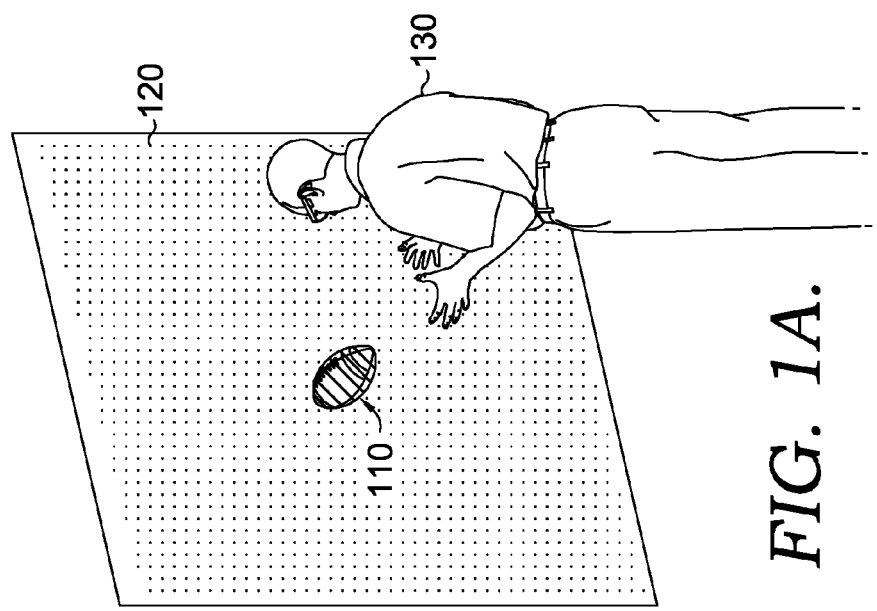

Referring now to the figures, FIGS. 1A-1B illustrate a sporting object, in these examples an American football, as viewed by an athlete. Background 120 and background 150 represent the background in the visual field of the subject 130 and the subject 150, respectively, when viewing the football. In both FIGS. 1A-1B, backgrounds 120 and 150 have the same visual appearance, which may comprise visual values or characteristics based on, for example, spectral reflectance, hue, intensity, and/or value. Of course, the visual appearance of the backgrounds may vary depending on the sport, the position of the athlete, the line of sight of the athlete, etc., as described in further detail below. One skilled in the art will understand and appreciate that the term "background", as used herein, refers to the visual background behind the sporting object as viewed by the athlete during training. A background may be a permanent construction (e.g., a wall of a training facility, gym, etc.) or a moveable construction that may be moved to various positions depending on the training methods used, or that may be moved outdoors for use on a playing field, court, etc. One skilled in the art will further understand and appreciate that the visual field of a subject may vary when training a subject depending on such factors as strengths or weaknesses of the subject's visual ability, type of sport or activity participated in by the subject, and the subject's level of competition. As used herein, "visual field" may refer to all types of visual fields known in the art, such as central visual field, peripheral visual field, the foveal area, and the like.

The sporting object 110 depicted in FIG. 1A is a standard American football, and its visual appearance varies from the visual appearance of background 120. The contrast of the visual appearance between background 120 and football 110 allows for relatively easy visibility and detection of football 110 by subject 130. Even with the contrast between background 120 and football 110, however, individual subjects may have greater or lesser ability to quickly visually detect football 110 from in front of background 120. Generally, individuals more able to quickly and accurately visually detect football 110 (as well as its speed, trajectory, rotation, etc.) in front of background 120 will possess a competitive advantage over individuals less able to quickly and accurately visually detect football 110 in front of background 120.

Of course, one of ordinary skill in the art will appreciate that the present invention is not limited to footballs, but may include any sporting object that is visually perceived during an athletic endeavor. Similarly, a background in accordance with the present invention may be any visual background in front of which a sporting object is seen by an individual.

The visual appearance of the sporting object, again an American football 140 in this example, in FIG. 1B has been configured in accordance with the present invention. More specifically, football 140 has been configured to visually approximate the visual values of background 150. Such visual approximation may include painting, dyeing, staining, coating, or otherwise configuring football 140 to approximate selected background visual characteristics based on, for example, background spectral reflectance, background hue, intensity, and/or value to obtain, for example, selected values of hue, value, and intensity. Visual approximation may also include adapting the subject's vision to create an appearance of low contrast between background 150 and football 140 by, for example, the subject using eyewear with special filters to view football 140.

Reflectances may be conveniently described as functions of wavelength over a wavelength range, frequencies over a frequency range, or alternatively, spectral reflectances may be described using color coordinates such as, for example, CIE tristimulus values X, Y, Z (or related values x, y, z), CIE uniform color space coordinates L, a, b, or other color coordinates or color representations.

By way of example, without limitation, the low contrast effect may be achieved by equalizing the luminance contrast (e.g., brightness of the background compared to the brightness of the sporting object); chromatic contrast (e.g., color contrast between the background and the object); and/or detail contrast (e.g., differences in the details of the background and the object, such as seams of the object, spectators in the stands, etc.).

Configuring football 140 to visually approximate the visual values of background 150 makes football 140 more difficult to visually detect by subject 160. When used during training, such a sporting object and background may enhance the subject's visual ability by developing the subject's ability to identify the sporting object, even under difficult circumstances. Moreover, when the subject is trained under greater visual stress (i.e., reduced contrast, more visual noise, etc.), the subject will have an easier experience visually when competing in a higher contrast, less visual noise environment. Thus, training a subject in an environment in accordance with the present invention will enhance the subject's visual abilities, such as figure-ground, form discrimination, anticipation timing, imagery/visualization, and usual attention focus, and enhance the subject's abilities to handle higher perceptual stress levels.

Background surfaces may be associated with one or more visual coordinates, typically colors, shades of gray, or one or more color coordinates such as hue, saturation, and value or other color coordinates. These visual properties may be assigned or associated with one or more surface regions of the sporting object. Such assignments may be based on such factors as time of day, location of playing surface, etc., so that different colors or shades are preferred at different times of day and/or seasons of the year.

Selection of spectral reflectances may be based on a particular illumination source for a particular stadium, practice facility, and the like, or an average of several illumination sources may be used. For example, spectral distributions associated with quartz-halogen lamps, metal halide lamps, fluorescent lights, or other artificial illumination sources may be used. In addition, spectral reflectances may be selected based on natural light illumination conditions, such as bright sunlight, cloud cover, snow, rain, fog, or other illumination conditions that are encountered at a particular location. Further, when training a subject in accordance with the present invention, the lighting source itself may be altered to increase difficulty of training. For example, the lights may be lowered or a different lighting system (e.g., UV, metal halide, incandescent, etc.) may be used, compared to the light system used during competition.

Referring now to FIGS. 2A-2B, another embodiment of the present invention is provided. In this example, the backgrounds (e.g., background 250 in FIG. 2A and background 220 in FIG. 2B) are the backgrounds viewed by the subject when the sporting object (e.g., football 260 in FIG. 2A and football 230 in FIG. 2B) is in the subject's visual field (e.g., when receiving the football, etc.). The visual appearance of football 230 and football 260 is identical in both FIGS. 2A-2B. Background 250 of FIG. 2A, however, contrasts with the visual appearance of football 260. In the example shown in FIG. 2B, the visual appearance of background 220 has been configured to visually approximate the visual appearance of football 230. So, for example, if football 230 in FIG. 2B represents a standard football (i.e., one used in an organized sporting competition such as at the college or high school level) and is natural tan in color, background 220 may be configured (e.g., by painting, dyeing, staining, coating, or otherwise configuring) to approximate the natural tan color of the football. The low contrast between the football and the background in FIG. 2B provides improved visual ability to a subject training in such an environment.

Further, because in many activities the color of the sporting object must be a standardized color, configuring the visual appearance of the background to approximate the particular sporting object may be simplified. For example, in football, the ball must be a natural tan color at some levels of competition (e.g., high school, college). Thus, as discussed with regard to FIGS. 2A-2B, in football training facilities utilizing embodiments of this invention, the backgrounds may all be similarly configured as far as each background's color, hue, luminance intensity, saturation, and/or value. By way of further example, in baseball, the standard ball color at both the college level (e.g., N.C.A.A.) and at the professional level is white. Thus, in accordance with embodiments of this invention, a background may be configured to visually approximate the visual values assigned to a standard, white baseball.

Other sports, such as soccer, do not have specific requirements for ball color. Accordingly, in such sports, one will not have the advantage of configuring a background to a standardized color. However, participants of such sports may have a standard color that is required in their particular league or in the majority of their competitions. If so, such a standard color may be used to configure the background of a training facility, gym, playing field, and the like.

Figure 3:
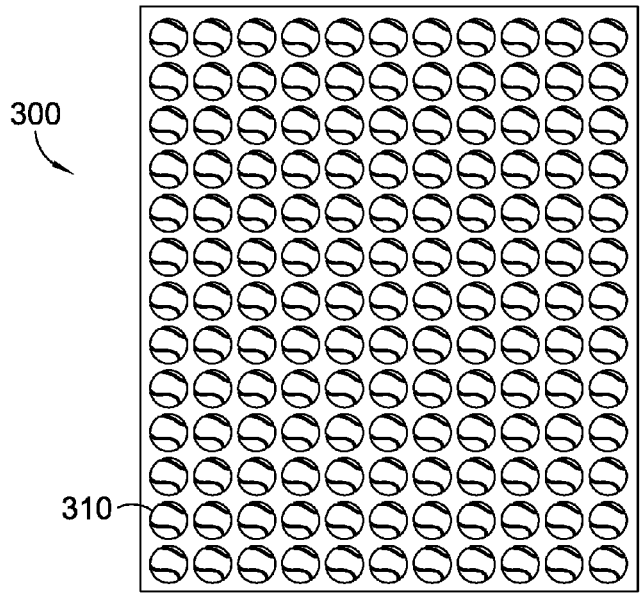
FIGS. 3 and 4 illustrate further equipment in accordance with the present invention.

In yet another embodiment of the present invention, a background may be configured to improve visual ability, as shown in FIG. 3. In this example, only background 300, which is configured to visually approximate the appearance of a plurality of sporting objects, is shown. For instance, in FIG. 3, the sporting object is a tennis ball 310. Accordingly, for this example, background 300 is configured with a visual appearance of a plurality of tennis balls.

Figure 4:
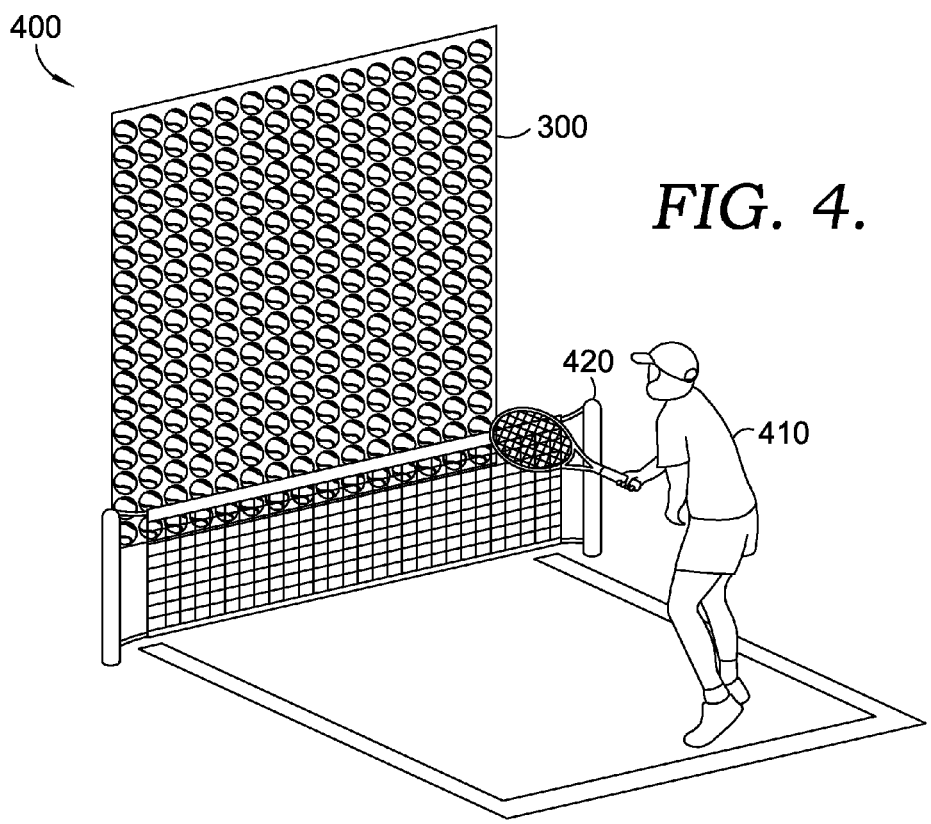

Referring now to FIG. 4, the background illustrated in FIG. 3 is used in training a subject 410. As can be seen in this example, the subject's visual field is towards the background 300. When the subject 410 is training, for example, with a training apparatus (e.g., a serving machine) or a partner that is on the opposite side of the net 420 from subject 410, background 300 may be set up or arranged in the subject's visual field behind the training apparatus or partner, allowing subject 410 to view background 300 when a ball has been released for him to return. By training using such a background 300, subject 410 develops his visual skills, particularly the ability to quickly and accurately identify a ball against a challenging visual background. One skilled in the art will appreciate that other types of backgrounds may be employed in conjunction with other types of sporting objects.

One skilled in the art will further realize that a background in accordance with the present invention may depict various views of one or more sporting objects (i.e., various rotational views, perspectives, etc.). One skilled in the art will further appreciate that the size of the objects depicted on a background in accordance with the invention may be adjusted based upon the distance between the subject, the background, and the sporting object so that the sporting object and depictions on the background are similarly sized in the subject's vision.

In an additional embodiment, the background in the individual's visual field may visually approximate specific background scenery, such as a stadium, a group of spectators, etc, which would be similar to training the individual under difficult conditions, such as those experienced on game day. An exemplary background may include a background of spectators, signage, and various details of the stadium in green and yellow for the University of Oregon. By way of example and not limitation, one method of configuring such a background may include using a video or still camera to capture an image of the background, and then, reproducing the image as the background. One skilled in the art will appreciate that various methods may be used to create and reproduce such a background. In this embodiment, the individual, when training, would have a background simulating a background that might be in their visual field during a competition.

One skilled in the art will appreciate and understand that all or some of the above examples discussed above may be used individually or combined to further train the athlete. For example, the background may be configured to visually approximate background scenery during competition, as discussed above, and the background may also depict various views of one or more sporting objects on the background.

Figure 5:
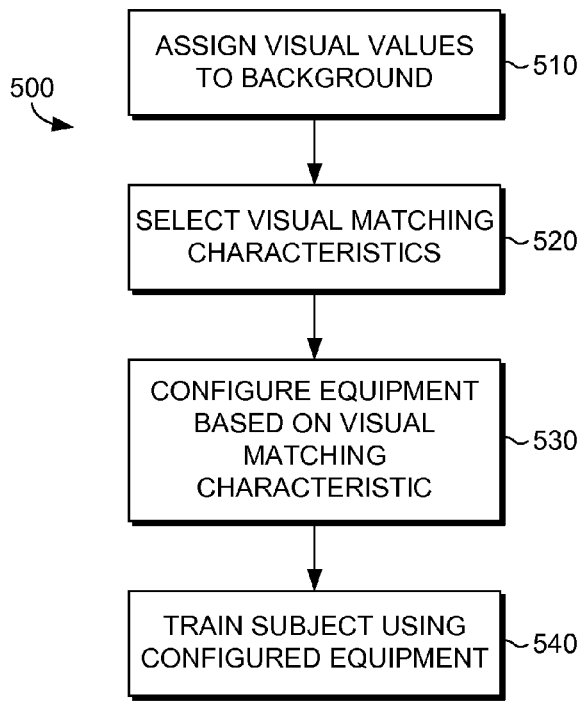
FIG. 5 is a flow diagram illustrating a method in accordance with the present invention.

Referring now to FIG. 5, a method in accordance with the present invention is illustrated as reference numeral 500. Initially, at step 510, visual values may be assigned to a background. At step 520, visual matching characteristics, such as spectral reflectance, hue, intensity, and/or value, may be selected for the background, as described above. Next, a sporting object or equipment is provided at step 530, and may be configured to match the visual matching characteristics selected in step 520. At step 540, a subject may train using the equipment configured in step 530 visually in front of the background.

Figure 6:
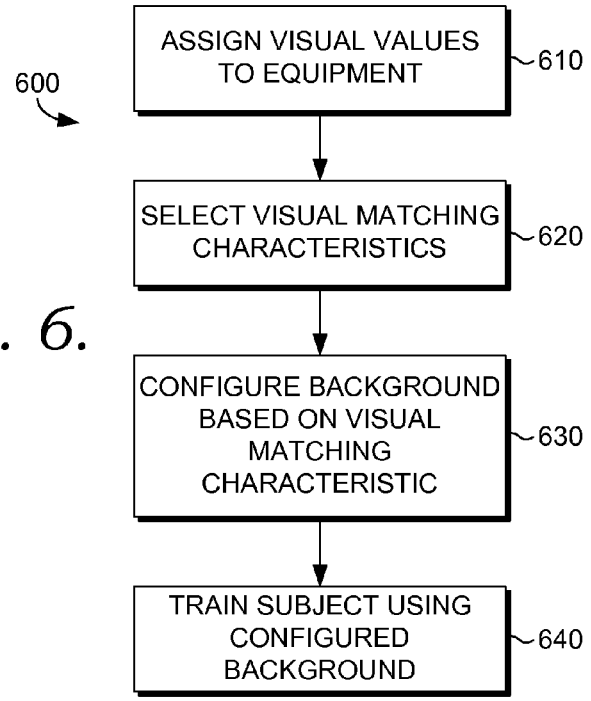
FIG. 6 is a flow diagram illustrating a further method in accordance with the present invention.

In FIG. 6, another method in accordance with the present invention is illustrated as reference numeral 600. In this method, equipment is provided at step 610 and visual values may be assigned to the appearance of the equipment. At step 620, visual matching characteristics of the equipment may be selected. Based on the visual matching characteristics, a background may be configured to match the visual appearance of the equipment in step 630. Then, a subject may be trained using the equipment visually in front of the configured background at step 640.

Figure 7:
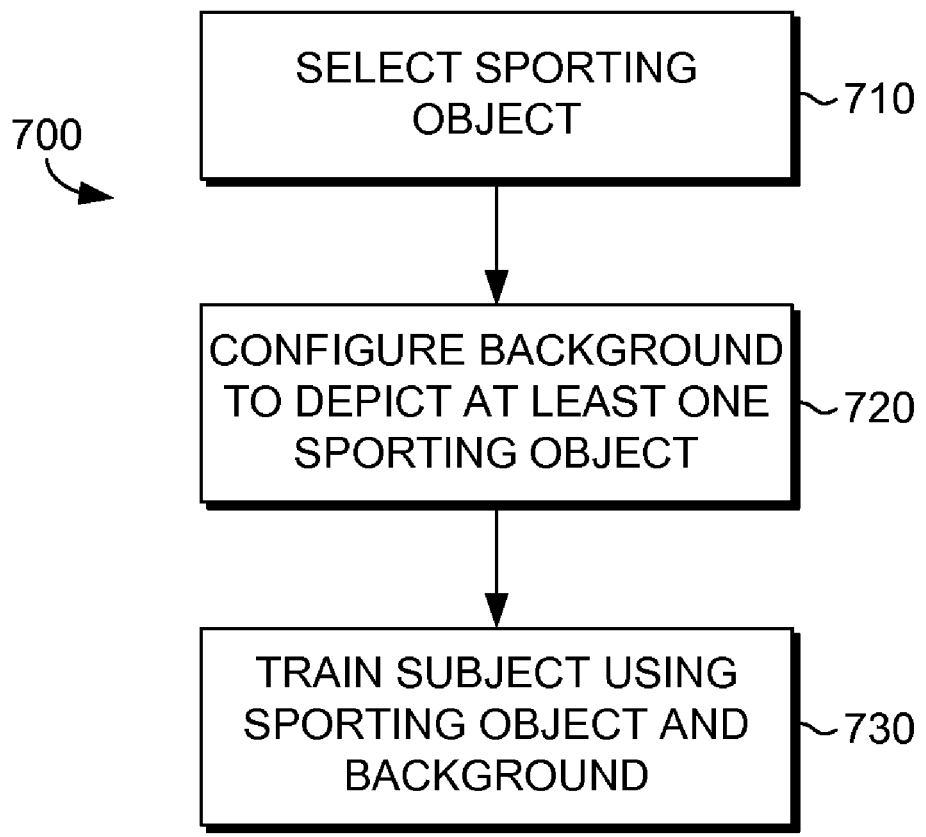
FIG. 7 is a flow diagram illustrating a further method in accordance with the present invention.

In FIG. 7, another method in accordance with the present invention is illustrated as reference numeral 700. In this example, a sporting object is provided in step 710. Next, in step 720, a background may be configured to depict one or more sporting objects. As discussed above, the sporting objects may be illustrated in various views and sizes when depicted on the background in step 720. Once the background has been configured, the subject, in step 730, may train using the sporting object or equipment visually in front of the configured background.

For purposes of this invention, one skilled in the art will understand and appreciate that the background may comprise more than one color. That is, the background may comprise various zones or regions of color to better facilitate training. Such zones or regions may be configured by assigning various particular visual characteristics to discrete portions of the sporting object, or, graded visual characteristics may be applied so that, for example, shading gradually varies from darker to lighter, rather than in discrete portions. A variety of visual characteristics may be varied, including total reflectance, spectral reflectance, or other visual characteristic.

For convenience, treatment of the visual appearance of a set of zones (including a continuously varying set of zones) may be referred to as visual compensation, correction, or matching. Generally, such compensation, correction, or matching is associated with reduction of apparent contrast between a visual obstruction or a visual distraction. In some examples, color matching is used, but typically one or more visual characteristics are approximately matched. Visual characteristics may be compensated based on equal brightnesses (isoluminant conditions), or based on different brightnesses for one or more zones with respect to an anticipated background.

By way of example, without limitation, color selection and characterization may be described based on a CIE L-a-b Color Space. A Total Color Difference (TCD) between colors having coordinates $(L_1, a_1, b_1)$ and $(L_2, a_2, b_2)$ in such a color space may be defined as $TCD= \sqrt{(a_1-a_2)^2+(b_1-b_2)^2+(L_1-L_2)^2}$. A Color Difference (CD) under isoluminant conditions (i.e., assuming identical brightnesses of the colors) may be defined as $CD= \sqrt{(a_1-a_2)^2+(b_1-b_2)^2}$. Compensating colors or gray levels may be selected based on TCD, CD, or on other coordinates. Because different surfaces receive different illumination, as described above, TCD-based matching is generally preferred.

Luminance contrast may also be selected for compensation and may be calculated using a spectral reflectance function $SRF(\lambda)$ (reflectance as a function of wavelength $\lambda$) of an object with respect to a particular light source. For the examples presented herein, a light source having a spectral distribution $D65(\lambda)$ and similar to sunlight is used. In addition, a human spectral sensitivity function $HSSF(\lambda)$ is used. A luminance coordinate L may be calculated as:

$$L = \frac{\int SRF(\lambda)D65(\lambda)HSSF(\lambda)d\lambda}{\int D65(\lambda)HSSF(\lambda)d\lambda}$$

Visual approximation or compensation may be configured based on colors or shades that are substantially similar as shown on, for example, a CIE plot. In some color representations, equal separations as graphed do not correspond to equal or even approximately equal perceived color differences. For example, so-called MacAdam ellipses of varying sizes and eccentricities may be used to characterize "just noticeable differences" (JND) in perceived colors as a function of coordinate location on the standard CIE chromaticity diagram. Colors may be selected for matching that are within or approximately within a MacAdam ellipse, or that are associated with a just noticeable color difference.

In a representative example, colors may be selected based on direct visual comparison using PANTONE color chips. For example, colors for a sporting object may be selected by situating a test subject in an environment similar to the actual use environment. For example, if the subject is a catcher in baseball, the subject may be situated in a catcher's position on a baseball diamond, and color chips placed at suitable locations in the subject's field of view so as to be observed against selected backgrounds such as, for example, dirt, grass, sky, or stadium seating. Responses from the test subject may be used to determine if colors associated with a particular chip provide an adequate match to a background. One or more test subjects may be used, and such color comparisons may be performed under various lighting conditions at different baseball diamonds. Average values, individual values associated with a most difficult viewing condition, or other values may be selected based on subject responses.

Selected color coordinates or other color or gray values may serve as a guide in dye or pigment selection, and actual applied colors or shades may differ. For example, dyes, coatings, or pigments that are satisfactory with respect to durability, cost, fading, or other factors may be unavailable. In some examples, actual colors deviate from associated target color coordinates to trade-off luminance contrast or other design goals. Fluorescent agents may also be included to enhance overall luminance to compensate for lower illumination levels.

While examples described above are based on particular color representations, one skilled in the art will understand and appreciate that color representations based on red-green-blue (RGB), cyan-magenta-yellow (CMY), hue-saturation-brightness (HSB), CIE XYZ, CIE, xyz, CIE L-a-b, CIE L-u-v, Munsell, or other representations may be used.

The present invention has been described herein in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain the ends and objects set forth above, together with other advantages which are obvious and inherent to the methods. It will be understood that certain features and sub-combinations are of utility and may be employed without reference to other features and sub-combinations. This is contemplated by and within the scope of the claims.

The invention claimed is:

1. A method of improving visual ability of a subject during athletic activities, the method comprising:
    providing an artificial background, the artificial background having a first set of visual values assigned thereto, the first set of visual values comprising spectral reflectance, hue, and intensity;
    providing an overhead artificial lighting source, the overhead artificial lighting source having a first spectral distribution;
    providing a sporting object having a speed, trajectory, and rotation, the sporting object having a visual appearance, the sporting object having a second set of visual values assigned thereto, the second set of visual values comprising spectral reflectance, hue, and intensity;
    creating a low-contrast effect between the sporting object and the artificial background by altering the second set of visual values associated with the sporting object to substantially approximate the first set of visual values associated with the artificial background;
    enhancing the low-contrast effect between the sporting object and the artificial background by changing the first spectral distribution of the overhead artificial lighting source to a second spectral distribution; and
    requiring the subject using the altered sporting object to initially visually acquire the moving altered sporting object in front of the artificial background while being subject to the overhead artificial lighting source having the second spectral distribution.

2. The method of claim 1, wherein the visual appearance of the sporting object is associated with a color.

3. The method of claim 1, wherein the second set of visual values further comprises a color.

4. The method of claim 3, wherein the color is green.

5. The method of claim 3, wherein the color is brown.

6. A method of improving visual ability of a subject during athletic activities, the method comprising:
    projecting a sporting object toward the subject, the sporting object having a speed, trajectory, and rotation, the sporting object having a first set of visual values assigned thereto, the first set of visual values comprising spectral reflectance, hue, and intensity;
    providing an overhead artificial lighting source, the overhead artificial lighting source having a first spectral distribution;
    providing a background, the background having a visual appearance, the background having a second set of visual values assigned thereto, the second set of visual values comprising spectral reflectance, hue, and intensity;
    creating a low-contrast effect between the sporting object and the background by altering the second set of visual values associated with the background to substantially approximate the first set of visual values associated with the sporting object;
    enhancing the low-contrast effect between the sporting object and the background by altering the first spectral distribution of the overhead artificial lighting source to a second spectral distribution; and
    requiring the subject to initially visually acquire the projected sporting object visually in front of the altered background while being subject to the overhead artificial lighting source with the second spectral distribution.

7. The method of claim 6, wherein the visual appearance of the background is associated with a color.

8. The method of claim 6, wherein the second set of visual values further comprises a color.

9. The method of claim 8, wherein the color is brown.

* * * * *